Feb. 17, 1925.
A. D. HARMON
ADJUSTING DEVICE
Filed Jan. 17, 1924
1,526,703
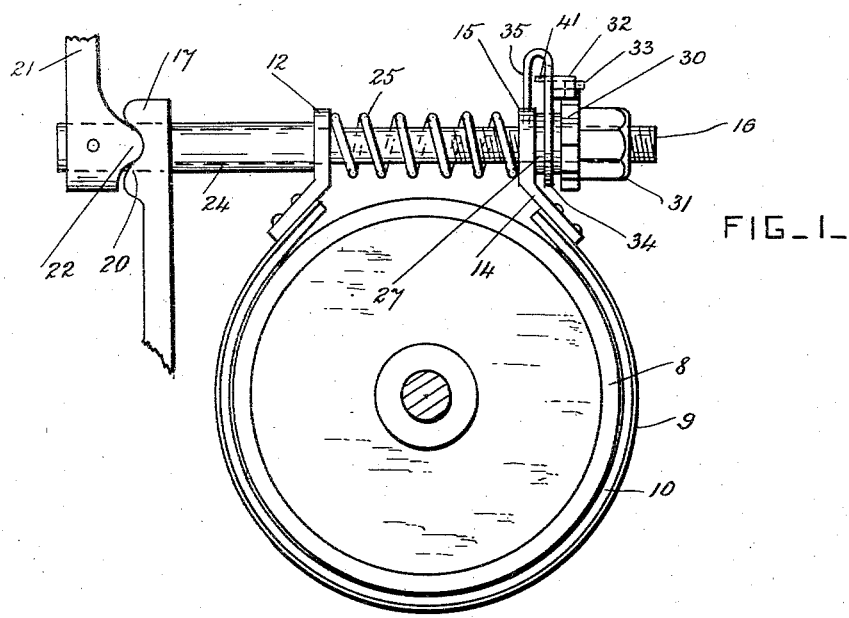
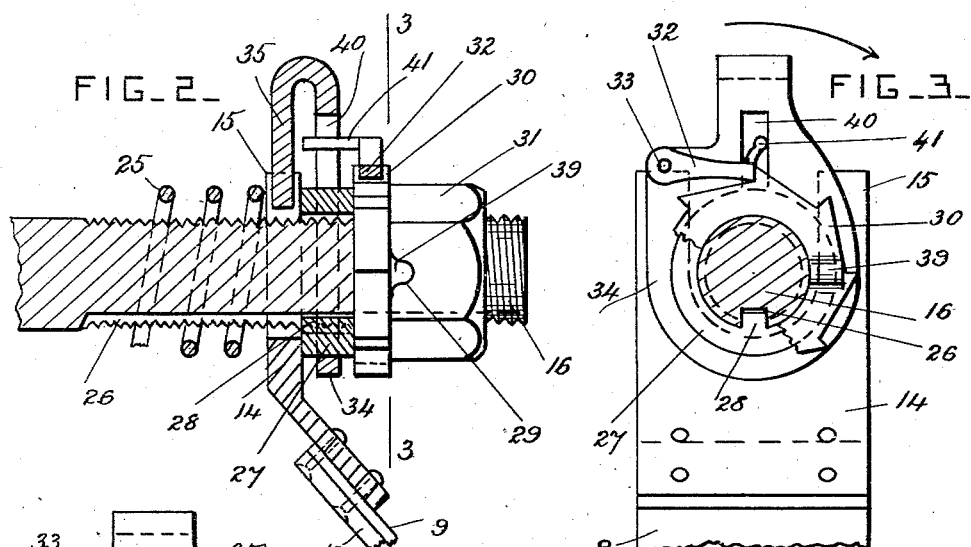
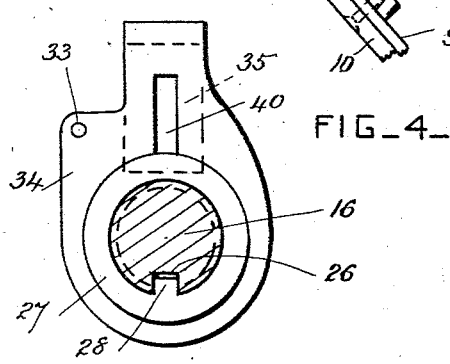
Inventor
Alton D. Harmon
by Herbert W. Jenner
Attorney Patented Feb. 17, 1925.

1,526,703

UNITED STATES PATENT OFFICE.

ALTON D. HARMON, OF ERIE, PENNSYLVANIA.

ADJUSTING DEVICE.

Application filed January 17, 1924. Serial No. 686,772.

*To all whom it may concern:*

Be it known that I, ALTON D. HARMON, a citizen of the United States, residing at Erie, in the county of Erie and State of Pennsylvania, have invented certain new and useful Improvements in Adjusting Devices, of which the following is a specification.

This invention relates to devices for automatically adjusting the brake straps on the brake wheels of the driving mechanisms of motor cars, as the brake straps become worn, which devices may also be used for other similar purposes; and it consists in the novel construction and combination of the parts hereinafter fully described and claimed.

In the drawings, Figure 1 is a side view of a brake wheel and a brake strap provided with automatic adjusting mechanism according to this invention. Fig. 2 is a side view of the adjusting devices drawn to a larger scale and partially in section. Fig. 3 is an end view of the adjusting devices showing the ratchet toothed wheel partially broken away, and the adjusting bolt in section on the line 3—3 in Fig. 2. Fig. 4 is a detailed view showing the washer and the support for the pawl.

A brake wheel 8, or other similar wheel, is mounted to revolve in any approved bearings. A brake strap 9 is provided, and preferably has a facing 10 of soft material secured to it which bears on the wheel 8. The end portions 12 and 14 of the brake strap are lugs which are secured to it, and both of them are preferably forked. The fork 15 of the lug 14 is used as a stop in carrying out this invention.

A screwthreaded bolt 16 is provided, and is arranged loosely in the forked lugs 12 and 14. This bolt is journaled in a stationary bearing 17 formed on any convenient part of the frame in which the wheel 8 is journaled, and it has a face cam member 20 formed on the opposite side of it from the brake strap. A lever 21 is secured on the outer end portion of the bolt 16, and has a face cam member 22 on it, which engages with the face cam member 20. A sleeve or enlargement 24 is provided on the bolt 16 between the bearing 17 and the forked lug 12, which prevents the lug 12 from moving to the left in Fig. 2. A helical spring 25 is arranged around the bolt 16 between the forked lugs 12 and 14 of the brake strap, and it normally holds them apart so that the brake strap is clear of the brake wheel.

The bolt 16 has a longitudinal keyway 26 in its outer end portion, and 27 is a washer mounted loosely on the bolt and provided with a projection 28 which engages with the keyway 26 so that the washer revolves with the bolt and is free to slide longitudinally on it.

A ratchet toothed wheel 30 is mounted loosely on the bolt, and the washer 27 is arranged between this ratchet toothed wheel and the lug 14 on the brake strap. A nut 31 is screwed on the bolt and is operatively connected with the ratchet toothed wheel by means of one or more tongues 39 on the said wheel which engage with corresponding grooves 29 in the nut.

A pawl 32 is provided for engaging with the teeth of the wheel 30, and is mounted on a pivot pin 33 which projects from a supporting plate 34. The plate 34 is mounted loosely on the washer so that the washer can revolve freely, and it has an arm 35 formed by bending over a portion of its upper part parallel to the plate 34. The plate 34 is not as thick as the washer 27. so that it is not gripped between the wheel 30 and the lug 14, and it may be formed of sheet metal if desired. The arm 35 is arranged in the fork 15 of the lug 14, and it prevents the plate 34 from revolving, so that the pivot pin 33 is always retained in a suitable position relative to the other parts of the device. A vertical slot 40 is formed in the plate 34. The end portion of the pawl has a projection 41 which works in this slot, and the end of the slot forms a stop which limits the movement of the pawl.

When used on a motor car, the lever 21 is the usual foot lever or brake pedal, and when this is depressed the cam members move the bolt 16 to the left hand in Fig. 2. The nut, ratchet toothed wheel and washer 27 then move the lug 14 towards the lug 12, against the pressure of the helical spring, and thereby tighten the brake strap on the brake wheel. The spring returns the parts to their original positions when the operating lever is released.

The brake band is adjusted automatically as it becomes worn by contact with the brake wheel. When the parts are newly adjusted, the pawl does not operate the ratchet toothed wheel, as the teeth of the wheel are spaced sufficiently far apart to permit the brake being operated for some time without causing the pawl to function. The nut, ratchet toothed wheel and washer all move circumferentially and longitudinally with the bolt 16, and the tangential face of the tooth slides under the pawl. When the brake strap becomes worn the lever can be depressed for a greater distance, and as the bolt then moves the ratchet toothed wheel for a greater distance in the direction of the curved arrow in Fig. 3, the pawl can drop into engagement with the radial face of the next tooth. When the lever is raised the pawl prevents the return movement of the ratchet toothed wheel and nut, and the bolt is thereby screwed into the nut, so that the nut, ratchet toothed wheel and washer are all moved to the left in Fig. 2, and the lug 14 is placed nearer the lug 12. The splined connection of the washer with the bolt ensures the movement of the nut when the bolt is oscillated, as the washer is pressed by the helical spring so that it bears with considerable friction against the ratchet toothed wheel.

The tongue and groove connection of the ratchet toothed wheel with the nut enables them to be made separate from each other, and is advantageous in adjusting the relative positions of the various parts to get the best action. The projection on the pawl enables a gravity pawl to be used without danger of its being jerked or jolted out of engagement with the ratchet toothed wheel. The springs of spring-pressed pawls are liable to get broken, and the use of a gravity pawl is preferred.

What I claim is:

1. An adjusting device, comprising, a revoluble wheel, a strap looped around the wheel and having a lug at one end, a screwthreaded bolt arranged in the said lug, means for moving the bolt circumferentially and longitudinally to apply the strap to the wheel, a ratchet toothed wheel and a nut which revolve together and engage with the said bolt, a washer interposed between and bearing laterally against the said lug and ratchet toothed wheel, a non-revoluble plate mounted loosely on the said washer, said plate being of less thickness than the said washer and being arranged clear of the said lug and ratchet toothed wheel, and a pawl pivoted to the said plate and engaging with the ratchet toothed wheel.

2. An adjusting device as set forth in claim 1, the said lug being forked, and the said plate having a projecting arm which engages with the fork of the lug and prevents the plate from revolving.

3. An adjusting device as set forth in claim 1, the said washer being splined to the said bolt and working in frictional engagement with the ratchet toothed wheel.

4. An adjusting device as set forth in claim 1, the said pawl being a gravity pawl and having a lateral projection, and the said plate having a slot in which the projection works and which limits the pivotal movement of the pawl.

5. An adjusting device as set worth in claim 1, the said ratchet toothed wheel and nut being operatively coupled together by a tongue and groove connection.

6. An adjusting device, comprising a brake wheel, a brake strap having a forked lug, a screwthreaded bolt arranged in the forked lug and provided with means for moving it so as to apply the brake strap to the brake wheel, a ratchet toothed wheel and a nut which revolve together and engage with the said bolt, a washer interposed between the said lug and ratchet toothed wheel, a non-revoluble plate mounted concentric with the said washer and provided with a radial slot, and a gravity pawl engaging with the ratchet toothed wheel and pivoted to the said plate and provided with a lateral projection which works in the radial slot and limits the movements of the pawl in one direction.

7. An adjusting device, comprising a brake wheel, a brake strap having a lug, a screwthreaded bolt arranged in the said lug and provided with means for moving it so as to apply the brake strap to the brake wheel, a ratchet toothed wheel mounted loosely on the said bolt, a nut screwed on the said bolt, said ratchet toothed wheel and nut being operatively coupled together by a tongue and groove connection, a washer interposed between the said lug and ratchet toothed wheel, a non-revoluble plate mounted concentric with the said washer, and a pawl pivoted to the said plate and engaging with the ratchet toothed wheel.

In testimony whereof I have affixed my signature.

ALTON D. HARMON.